United States Patent [19]

Leoni et al.

[11] Patent Number: 4,912,196
[45] Date of Patent: Mar. 27, 1990

[54] POLYAMIDE OF DIMERIZED FATTY ACIDS AND POLYETHER UREA DIAMINES AND THEIR USE AS ADHESIVES

[75] Inventors: Roberto Leoni, Mailand, Italy; Werner Gruber, Korschenbroich, Fed. Rep. of Germany; Angela Rossini, Mailand, Italy

[73] Assignee: Henkel Kommanditgesellschaft auf Aktien, Duesseldorf, Fed. Rep. of Germany

[21] Appl. No.: 221,962

[22] Filed: Jul. 20, 1988

[30] Foreign Application Priority Data

Jul. 20, 1987 [DE] Fed. Rep. of Germany ....... 3723941

[51] Int. Cl.$^4$ ............................................. C08G 69/34
[52] U.S. Cl. .................................. 528/339.3; 528/338; 528/339; 528/340; 528/367
[58] Field of Search ...................... 528/339.3, 338, 339, 528/340, 367

[56] References Cited

U.S. PATENT DOCUMENTS 4,062,820  12/1977  Mitchell, III et al. ............ 260/18 N
4,122,229  10/1978  Mitchell, III et al. ............. 428/261
4,218,351   8/1980  Rasmussen ....................... 260/18 N Primary Examiner—Harold D. Anderson
Attorney, Agent, or Firm—Ernest G. Szoke; Wayne C. Jaeschke; John E. Drach

[57] ABSTRACT

Thermoplastic polyamide resins with improved low-temperature flexibility and improved bonding properties consisting essentially of polycondensates of the following components:

(a) 10 to 50 mol-% of a dimer fatty acid or mixture of such acids,
(b) 5 to 45 mol-% of polyoxyalkylene urea diamine,
(c) 0 to 25 mol-% of an aliphatic $C_6$-$C_{22}$ dicarboxylic acid or mixture of such acids,
(d) 0 to 45 mol-% of an aliphatic, aromatic or cyclic $C_2$-$C_{40}$ diamine or a mixture of such diamines selected from the group comprising diprimary diamines, diamines containing secondary amino groups and alkyl substituents with no more than 8 carbon atoms at the nitrogen atom, and heterocyclic diamines capable of double amide formation.

Preferred resins are base-terminated resins having amine values of up to 50 and acid-terminated resins having acid values of up to 20 and a molecular weight within the range from 5000 to 20,000 and preferably from 8000 to 15,000. The polyamide resins may be applied in as a melt between surfaces to be bonded and subsequently left to set for fixing and may be used either on their own or with other auxiliaries as hotmelt adhesives.

4 Claims, No Drawings

POLYAMIDE OF DIMERIZED FATTY ACIDS AND POLYETHER UREA DIAMINES AND THEIR USE AS ADHESIVES

BACKGROUND OF THE INVENTION

1. Field of the Invention

This invention relates to new polyamides which are suitable for use as adhesives, particularly hotmelt adhesives. The new polyamide resins contain dimerized fatty acids on the acid side condensed with polyoxyalkylene urea diamines capable of diamide formation on the base side.

2. Statement of Related Art

Hotmelt adhesives are acquiring increasing significance in numerous areas of bonding technology. The advantages of hotmelts lie in the fact that they develop the necessary bond strength by cooling from the melt and, accordingly, are suitable for high-speed production processes. Further advantages lie in the fact that there is no need for apparatus for protection against solvent vapors and the often long drying times required for water-based adhesives are avoided.

One important class of hotmelt adhesives are the polyamides, among which polyamides based on dimerized fatty acids have acquired particular significance. Among the polyamides based on dimerized fatty acids, polyamides which contain dimerized fatty acids in the acid component and ether diamines in the amine component are particularly preferred by virtue of their good low-temperature properties.

German Patent document DE-A 27 54 233 describes copolyamide resins which, on the acid side, contain a special mixture of polymeric fatty acids (dimer fatty acid) and aliphatic $C_6$–$C_{12}$ dicarboxylic acids and, on the base side, a mixture of saturated aliphatic diamines and polyoxyalkylenediamines. The products show a brittleness temperature of $-25°$ C.

Similar resins are described in U.S. Pat. No. 4,218,351 which relates to polyamides containing 5 to 50 mol-% dimer fatty acid and 0.25 to 12.5 mol-% amorphous oligomers (polyoxyalkylene diamines) in addition to standard raw materials. Although the behavior of the composition at very low temperatures can be improved as disclosed in the patent, an additional mixing step is necessary.

Although the polyether diamine-containing polyamides mentioned above show satisfactory properties for many applications, it was nevertheless desirable to improve their behavior at low temperatures and their adhesion to various substrates.

Accordingly, an object of the present invention is to provide improved polyamides which may be used as hotmelt adhesives.

Yet another object of this invention is to provide polyamides having improved low temperature flexibility.

DESCRIPTION OF THE INVENTION

Other than in the operating examples, or where otherwise indicated, all numbers expression quantities of ingredients or reaction conditions used herein are to be understood as modified in all instances by the term "about".

The present invention relates to thermoplastic polyamide resins showing improved flexibility behavior at relatively low temperatures and outstanding adhesion to various surfaces such as metals and plastics.

The new thermoplastic polyamide resins consist essentially of polycondensates of the following components:

(a) 10 to 50 mol-% of a dimer fatty acid or a mixture of such acids,
(b) 5 to 45 mol-% of polyoxyalkylene urea diamine,
(c) 0 to 25 mol-% of an aliphatic $C_6$–$C_{22}$ dicarboxylic acid or a mixture of such acids,
(d) 0 to 45 mol-% of an aliphatic, aromatic or cyclic $C_2$–$C_{40}$ diamine or a mixture of such diamines selected from the group consisting of diprimary diamines, diamines containing secondary amino groups and alkyl substituents with no more than 8 carbon atoms at the nitrogen atom or heterocyclic diamines capable of double amide formation.

The present invention also relates to the use of the new polyamide resins as adhesives and preferably as temperature-resistant hotmelts. The polyamide resins according to the invention thus consist of an acid component and an amine component, one or both of which components are preferably mixed acids and/or mixed amines.

The most important constituent of the acid component are dimer fatty acids. Dimer fatty acids are understood to be products which contain as their principal constituent the dimerization product of one or more unsaturated fatty acids. Dimer fatty acids are known in the art for the preparation of polyamides. Typical dimer fatty acids normally contain varying amounts of trimer fatty acids and monofunctional fatty acid esters. Dimer fatty acids containing less than 10 mol-% and more especially less than 5 mol-% of trimer fatty acid are especially suitable for the purposes of the invention, because an excessive content of trimer fatty acid can lead to gelation of the polyamide. This undesirable effect can be prevented by the addition of chain terminators such as monofunctional fatty acids or monofunctional amines.

Dimer fatty acids obtained by dimerization of $C_{18}$ fatty acids and containing 36 carbon atoms are particularly preferred. In addition, shorter-chain or longer-chain dimer fatty acids may also be used.

The polyamide resins according to the invention may optionally contain 1 to 25 mol % of an aliphatic $C_6$–$C_{22}$ dicarboxylic acid or a mixture of such acids as a further acid component. Saturated $C_6$–$C_{12}$ dicarboxylic acids, more especially linear carboxyl-terminated dicarboxylic acids, are preferred for this purpose. Examples of suitable acids include adipic acid, heptane dicarboxylic acid, octane dicarboxylic acid (sebacic acid), azelaic acid, nonane dicarboxylic acid, and brassylic acid, mixtures of two or more of these acids, and also higher homologs thereof. The following applies to the choice of the type and quantity of dicarboxylic acid:

Where polyamide resins of low melting point are required, the aliphatic $C_6$–$C_{22}$ dicarboxylic acids can be omitted or used only in small quantities. Where high melting points are required, larger amounts of such dicarboxylic acids are used, preferably the shorter-chain types, such as adipic acid. The preferred range of content of aliphatic $C_6$ to $C_{22}$ dicarboxylic acid, when used, is 3 to 22 mol %, with the most preferred level being 5 to 18 mole %.

The polyamide resins according to the invention contain as their most important constituent 5 to 45 mol-% of a diamine corresponding to the following general formula:

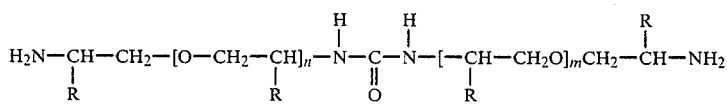

wherein R is H, CH$_3$, or C$_2$H$_5$ and n is an integer of from 1 to 50. Preferably R is CH$_3$ and n is 5 to 30. Such diamines are prepared by reaction of the corresponding diamine, for example a polyoxyethylenediamine, with urea in a ratio of 2:1. Bis-(3-aminopropyl)-polytetrahydrofurans may also be reacted as the diamine component. In this case, the resulting diamines have the following structure:

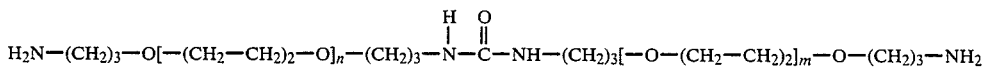

wherein n is an integer from 6 to 20.

The polyamide resins according to the invention may optionally contain as a further amine component from 1 to 45 mol-% aliphatic, aromatic or cyclic diamine or a mixture of such diamines containing from 2 to 40 carbon atoms selected from the group comprising diprimary diamines, diamines containing secondary amino groups and alkyl substituents with no more than 8 carbon atoms at the nitrogen atom or heterocyclic diamines capable of double amide formation. Preferred diamines include C$_2$–C$_{20}$ diamines including the lower linear or branched, aliphatic or monocyclic diprimary diamines and monocyclic, heterocyclic diamines. The diamines useful in the present invention may be divided into various groups. One group is the diprimary aliphatic amino-terminated diamines. Of these, amines corresponding in their carbon structure to the above-mentioned dicarboxylic acids, including dimer fatty acids, are preferred. Typical representatives of such diamines include ethylenediamine, propylenediamine, hexamethylenediamine and homologs thereof and also dimer fatty diamine which may be obtained by conversion of dimer fatty acids into the dinitriles and subsequent hydrogenation of the two nitrile groups. Another group of diamines which may be used are aromatic diamines. These include diamines of the type derived from benzene, tuluene or other substituted aromatics, for example 2,6-tolylenediamine, xylylenediamine and 4,4'-diphenylmethanediamine. The analogous cyclohexane diamines may also be used.

Another class of diamines which may be used in the preparation of the polyamide resins according to the invention include diamines which contain one or two secondary amino groups containing one alkyl substituent with no more than 8 carbon atoms at the nitrogen atom. Such diamines are derived from the above-mentioned diprimary aliphatic diamines and contain a short-chain alkyl substituent, preferably methyl, ethyl or propyl, at the nitrogen atom.

Yet another class of diamines which may be used include heterocyclic diamines which are capable of double amide formation, preferably aliphatic heterocycles. The most preferred member of this group is piperazine.

The preferred range of content of the above diamines, when used, is 5 to 40 mole %, with the most preferred level being 15 to 30 mole %.

The polyamide resins according to the invention may contain acid components and amine components in approximately stoichiometric quantities. For use as hotmelts, it is preferred in the majority of cases that residual amino groups or residual acid groups be present. To achieve this, an excess of acid or base of no more than 10 equivalent percent of all functional groups is used. Base-terminated resins have amine values of up to 50, preferably from 2 to 20 and more preferably from 2 to 15 while acid-terminated resins should have an acid value of up to about 20 and preferably from 2 to 10.

The polyamide resins according to the invention have a molecular weight (number average) of from 5000 to 20,000 and preferably from 8000 to 15,000. To obtain high molecular weights, the acid and base components are used in substantially equivalent quantities, whereas to obtain low molecular weights an excess of one component may be used. Another method of reducing molecular weight is to add chain terminators such as monofunctional fatty acids or monofunctional amines. The molecular weight may be increased by including a certain percentage of a trifunctional component such as trimer fatty acid, in the reaction medium.

The polyamides according to the invention have a softening point (determined in accordance with ASTM-E 28) of 60° to 200° C. and preferably of 80° to 150° C.

The low-temperature properties of the polyamides of this invention are excellent. The requirements of the Mandrel test, which includes winding of a test specimen measuring 20 mm×170 mm at a thickness of 1 mm through 360° around a brass cylinder 25.6 mm in diameter, are satisfied even at −65° C. This property is of considerable importance for special applications such as potting of push-fit connections in the refrigeration field. Another advantage of such polyamides are their adhesion properties. The creation of more favorable substrate adhesion through the incorporation of the polar urea group in the macromolecule of the polyamides of this invention makes them particularly useful as hotmelt adhesives for difficult-to-bond plastic materials such as polyvinylchloride, polyesters, polyethylene and metals such as aluminum, copper and iron. They may be used to bond plastic-to-plastic, metal-to-metal, or metal-to-plastic.

EXAMPLES 1–3

The new polyamides were prepared from the following components as listed in Table 1:

Acid Components

Technically pure stearic acid, sebasic acid, and azelaic acid. The dimer fatty acid was technical dimerized fatty acid (natural mixture of C$_{16}$/C$_{18}$ FA) containing 1% by weight monomeric FA, 95% by weight dimeric FA and 4% by weight trimeric FA.

Amine Components

Technically pure ethylenediamine; dimer fatty acid diamine obtained from the above-described dimer fatty acid by conversion into the nitrile and subsequent hydrogenation; the polyoxyalkylenediamine was bis-(2-aminopropyl)-polyoxypropylene oxide (molecular weight 2000). Reaction product of 1 mol urea with 2 mol of a bis-(2-aminopropyl)-polyoxypropylene oxide having an average molecular weight of 3000.

The condensation was carried out with stirring under nitrogen in a glass flask. The carboxylic acids initially introduced were first heated to approximately 60° C., after which the other reaction components were added. The reaction mixture was then heated to 230° C. over a period of 1 hour and was then kept at that temperature for 1 hour. Thereafter the reaction mixture was evacuated to 15 mbar at a constant temperature during the next hour. After cooling to 210° C., the reaction product was drained off and isolated to determine its properties.

In Table 1 below, the quantities used in grams and also the amine and acid values of the reaction product are shown below the Example number. The softening point (R+B, ASTM E-28) and also the low-temperature flexibility values in °C. are also shown. The low-temperature flexibility values were determined by the Mandrel test. To this end, a test specimen measuring 20 mm×170 mm for a thickness of 1 mm was wound through 360° around a 25.6 mm diameter brass cylinder. The tests were conducted at decreasing temperatures (test specimen and cylinder in temperature equilibrium). The Mandrel temperature was the lowest temperature at which three out of five test specimens withstood the winding test without breaking.

The quantities of components used and also their characteristic chemical and physical data are shown in Table 1 below under the Example number.

TABLE 1

| Components/characteristic Data | Example 1 | Example 2 | Example 3 |
|---|---|---|---|
| Dimer fatty acid | 468.4 g | 604.4 g | 638.6 g |
| Stearic acid | — | 3.6 g | 3.4 g |
| Azelaic acid | — | 35.4 g | — |
| Sebacic acid | — | — | 15.8 g |
| Polyoxyalkylene urea diamine | 468.4 g | 282.4 g | 271.0 g |
| Ethylenediamine | 39.4 g | 74.2 g | 71.2 g |
| Dimer fatty acid diamine | 23.8 g | — | — |
| Softening point | 100° C. | 150° C. | 130° C. |
| Viscosity at 210° C. (mPa.s)* | 1 500 | 2 500 | 2 900 |
| Amine value | 4 | 5.5 | 5 |
| Acid value | 1 | 1 | 1.3 |
| Mandrel test | −65° C. | −65° C. | −60° C. |

NOTE: *1 Pascal second (Pa.s) approximates 1 centipoise second (cps)

EXAMPLES 4-6

In order to compare properties of polyamides prepared in accordance with this invention with prior art polyamides, polyamides were prepared by the process of Examples 1-3 except that the polyoxyalkylenediamine listed above was used as a reactant instead of the polyoxyalkylene urea diamine of Examples 1-3. The quantities of reactants are shown in Table 2, and the properties of the resulting polyamides were determined in the same manner as set forth above.

TABLE 2

| Components/Characteristic Data | Example 4 | Example 5 | Example 6 |
|---|---|---|---|
| Dimer fatty acid | 554.7 g | 667.3 g | 702.0 g |
| Stearic acid | — | 3.9 g | 3.8 g |
| Azelaic acid | — | 39.1 g | — |
| Sebacic acid | — | — | 17.4 g |
| Ethylenediamine | 40.9 g | 81.9 g | 78.2 g |
| Dimer fatty acid diamine | 122.9 g | — | — |
| Polyoxyalkylenediamine | 291.9 g | 207.8 g | 198.6 g |
| Softening point | 95° C. | 160° C. | 135° C. |
| Viscosity at 210° C. (mPa.s) | 4 000 | 4 000 | 2 750 |
| Amine value | 3 | 5.5 | 5 |
| Acid value | 1 | 1 | 1 |
| Mandrel test (100% pass) | −45° C. | −45° C. | −45° C. |

As can be seen from a comparison of the property data of Examples 1-3 and counterpart Examples 4-6, the polyamides of this invention exhibit a markedly improved low temperature flexibility ranging from −60° C. to −65° C. when compared with the prior art materials, −45° C.

The bonding properties of the polyamides of Examples 1-6 were determined by determining tensile shear strength in accordance with German Industrial Norm DIN 52 283. The following materials were bonded: aluminum to aluminum (Al/Al), PVC to PVC (rigid PVC) and polyester film (polyethylene terephthalate) PE to PE.

The measured values in N/mm$^2$ are shown in Table 3 with respect to the polyamides of Examples 1-3 and in Table 4 with respect to the polyamides of Examples 4-6. Laminates were formed by applying a melt of the polyamides to a surface of the metal or plastic film, bringing the hot coated surface into contact with the non-coated surface of the outer film, applying pressure and allowing the laminate to cool.

TABLE 3

| Substrate | Example 1 | Example 2 | Example 3 |
|---|---|---|---|
| Al/Al | 10.6 | 10.8 | 11.8 |
| PVC/PVC | 9.5 | 7.0 | 9.1 |
| PE/PE | 4.5 | 3.0 | 4.7 |

TABLE 4

| Substrate | Example 4 | Example 5 | Example 6 |
|---|---|---|---|
| Al/Al | 4.5 | 5.4 | 3.5 |
| PVC/PVC | 1.9 | 2.3 | 2.0 |
| PE/PE | 0.4 | 0.8 | 0.5 |

The enhanced bonding properties of the polyamides of this invention are evident by a comparison of test results for the polyamides of Examples 1-3 in Table 3 with prior art polyamides of Examples 4-6 in Table 4.

It is to be understood that the above described embodiments of the invention are illustrated only and that modifications throughout may occur to those skilled in the art.

We claim:

1. A thermoplastic polyamide resin having improved low temperature flexibility and improved bonding properties consisting essentially of polycondensates of the following components:
   (a) from about 10 to about 50 mole-% of a dimer fatty acid or a mixture of such acids, (b) from about 5 to about 45 mole-% of a polyalkylene urea diamine, (c) 0 to about 25 mole-% of an aliphatic $C_6$ to $C_{22}$ dicarboxylic acid or mixture of such acids, and (d) 0 to about 45 mole-% of an aliphatic, aromatic or cyclic $C_2$ to $C_{40}$ diamine or mixture of such diamines selected from the group consisting of diprimary diamines, diamines containing secondary amino groups and alkyl substituents with no more than 8 carbon atoms at the nitrogen atom, and heterocyclic diamines capable of double amide formation, and wherein said polyamide resin has a softening point of from about 60° C. to about 200° C.

2. The polyamide resin of claim 1 having a number average molecular weight of from about 5000 to about 20,000.

3. The polyamide resin of claim 2 having a molecular weight of from about 8,000 to about 15,000.

4. The polyamide resin of claim 1 wherein said polyamide resin contains an excess of acid or amine of no more than 10 equivalent percent of the total of the acid and amine groups.

* * * * *